Dec. 1, 1942.   H. W. BELL   2,303,904
MEANS FOR CONTROLLING SIDE-SWAY IN VEHICLES
Filed Nov. 10, 1939   3 Sheets-Sheet 1
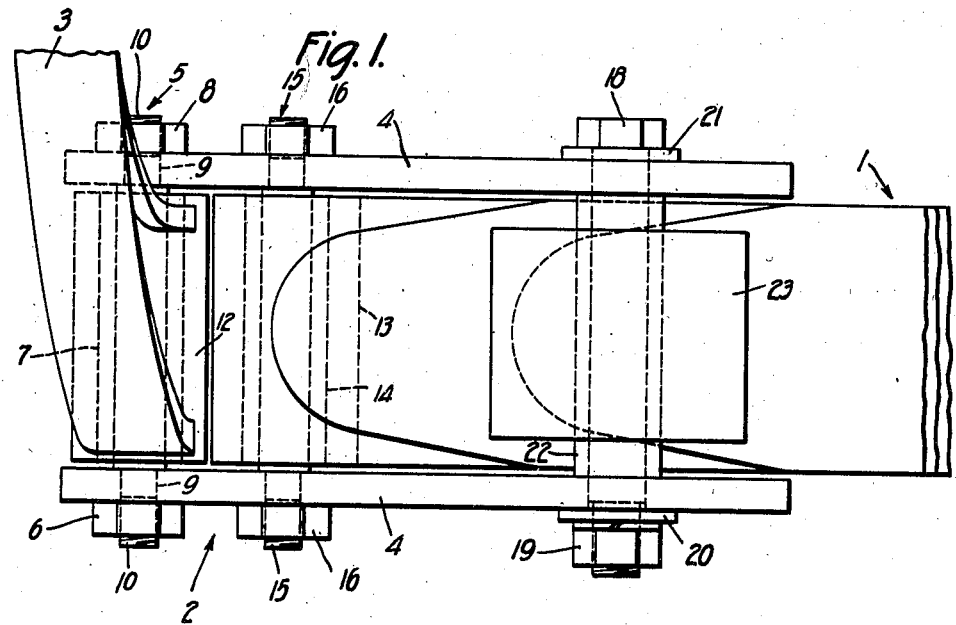
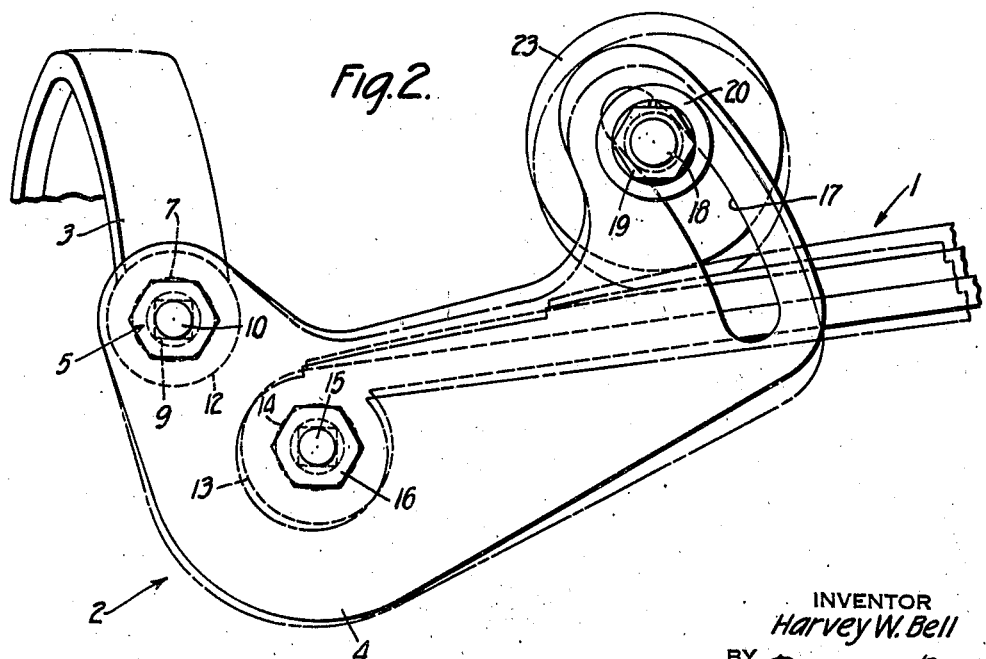
INVENTOR
Harvey W. Bell
BY
ATTORNEYS Dec. 1, 1942.   H. W. BELL   2,303,904
MEANS FOR CONTROLLING SIDE-SWAY IN VEHICLES
Filed Nov. 10, 1939   3 Sheets-Sheet 2
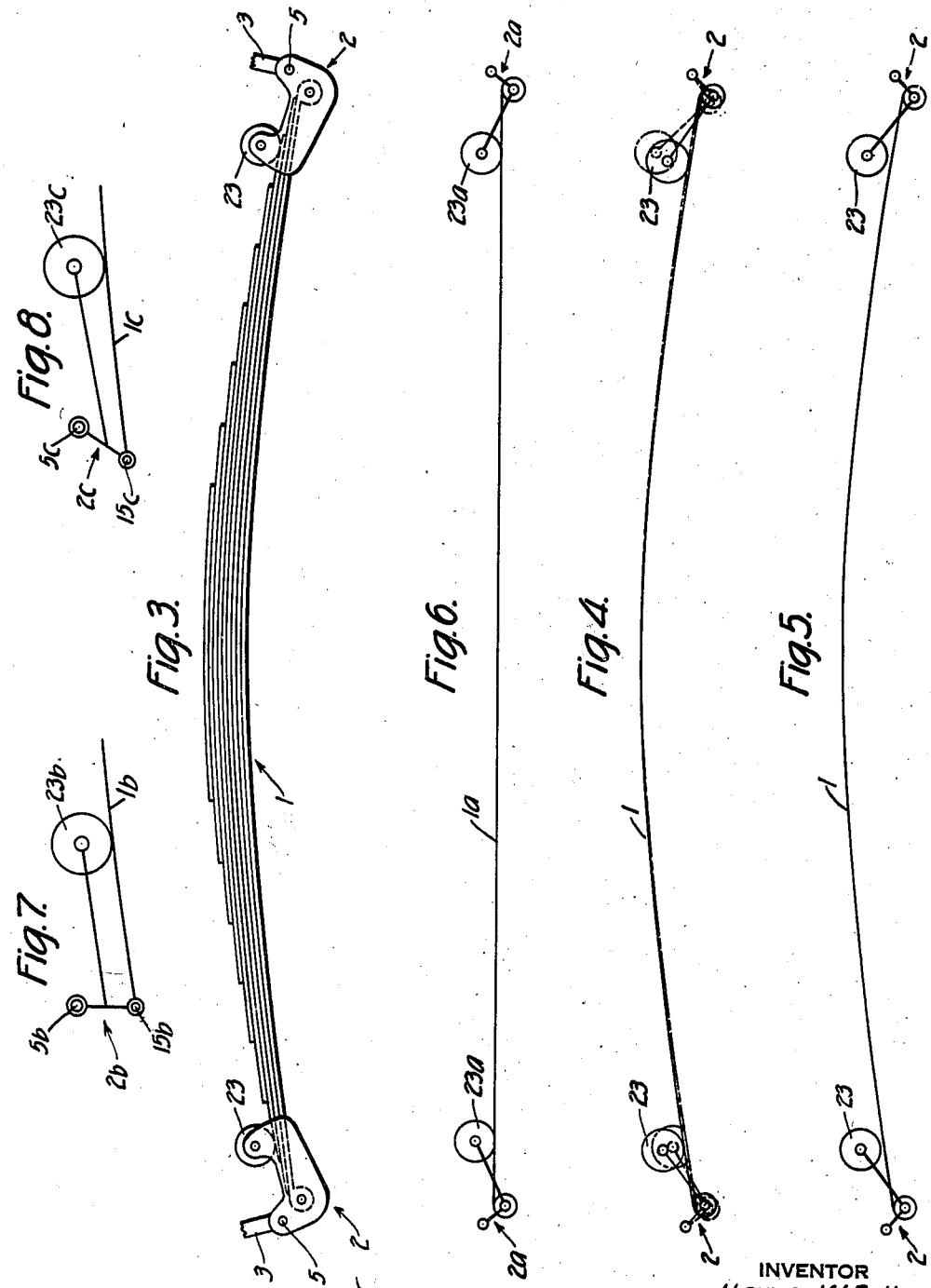
INVENTOR
*Harvey W. Bell*
BY *Moses & Nolte*
ATTORNEYS

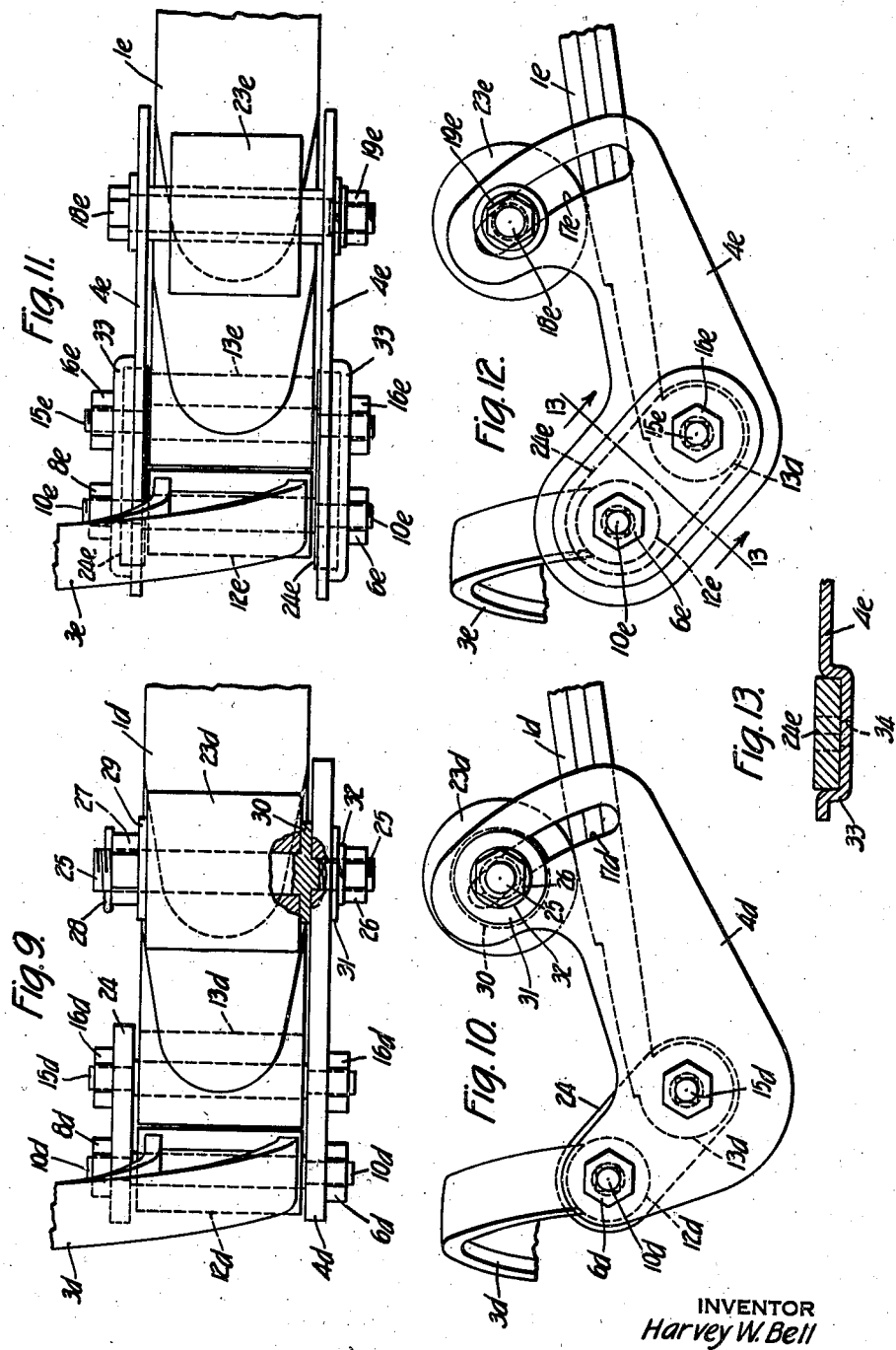

Patented Dec. 1, 1942

2,303,904

UNITED STATES PATENT OFFICE 2,303,904

MEANS FOR CONTROLLING SIDESWAY IN VEHICLES

Harvey W. Bell, Ardsley on Hudson, N. Y.

Application November 10, 1939, Serial No. 303,724

16 Claims. (Cl. 267—17)

This invention relates to means for controlling side sway of the sprung parts of motor vehicles, particularly motor vehicles employing a transverse spring for carrying sprung parts.

It is a primary object of the invention to provide means which will sharply limit or substantially eliminate side sway of the sprung parts, but which will not objectionably modify nor interfere with the normal spring action under conditions of straight compression and rebound.

A transverse vehicle spring of the kind referred to is commonly bowed upward, is arranged to support the load of the sprung parts midway between its ends, and has its ends suspended by tension shackles from unsprung parts of the vehicle. The shackles or equivalent suspension means are necessary in order to permit the ends of the spring to move farther apart and nearer together as the spring changes flexure under the variable flexing stresses which occur on the road. The shackles, however, introduce an objectionable capacity for side sway of the sprung parts in response to the centrifugal forces which come into play when the vehicle changes direction, since each spring end is supported with capacity for moving either outward or inward, and both ends may move in the same direction simultaneously.

When the vehicle is at rest or is running in a straight course along a smooth road, the load applied to the spring by the sprung parts is a spring flexing load which acts vertically upon the center of the spring and which is transmitted equally to the spring ends. The encountering of a bump or depression serves to increase or diminish the spring flexing load and to change the spring flexure temporarily.

When, on the other hand, the vehicle rounds a turn, a horizontally acting centrifugal force comes into play which tends to displace the sprung parts toward the outer side of the turn. Such force does not tend substantially to alter the flexure of the spring. If the shackles are free to shift outward, the spring, together with the sprung parts, will sway outward, these parts taking up new positions consistent with the relative magnitudes and directions of the effective forces. When the vehicle thereafter straightens out, the parts sway to and through their normal or at rest positions and a certain amount of lateral oscillation occurs for a time.

The action which occurs when the car runs upon the side of a crowned road is similar to that which occurs when centrifugal force is acting. The force of gravity then extends obliquely to the axle and may be analyzed into components at right-angles to the axle and parallel to it. The latter component tends to sway the sprung parts toward the down side. The condition is especially aggravated when a crowned road curves toward the left.

The distinction here sought to be stressed is that some running conditions cause the sprung parts to apply forces which unobjectionably affect the spring action, while other running conditions introduce lateral forces which tend objectionably to sway the sprung parts and the spring sidewise, but which do not substantially affect the flexure of the spring.

It is an object of the present invention to provide means associated with each spring end which strongly opposes any outward displacement of the spring end not produced by changed flexure of that end of the spring, but which is incapable of opposing any objectionable resistance to outward movements of the spring end produced by changed flexure of that end of the spring.

Further objects of the invention are to achieve the above indicated mode of operation by the employment of parts which are few, simple and inexpensive; also in a manner which involves no necessary modification of vehicle parts other than the shackles themselves.

To these ends it is a feature of the invention that shackles are provided in the form of triangular or bell-crank levers, each lever having a first point pivotally connected to an unsprung part to constitute the fulcrum, a second nearby point at a lower level pivotally connected to a spring end, and a third point more remote from the fulcrum provided with an abutment member which engages a part of the upper face of the spring for sharply checking and limiting approach of such third point toward the spring. The abutment member may be of a hard unyielding construction, or it may be formed in whole or in part of a resilient, nonmetallic material such as rubber, to avoid metal-to-metal noises and to avoid excessive strains. The abutment member is in any case, however, characterized by the fact that it is not compressible through more than a very limited range.

With an arrangement such as that referred to, the shackle lever is free to rock outward when there is a corresponding downward flexure of the spring, but the lever is restrained against outward rocking when there is no corresponding downward flexure of the spring. Each shackle, therefore, serves to prevent substantial swaying of the vehicle body toward the side at which the shackle is located, but has little or no effect upon the normal spring action in response to variations of vertical load.

Other objects and advantages will hereinafter appear.

In the drawings forming part of this specification:

Figure 1 is a fragmentary plan view illustrating the left end of a transverse vehicle spring and associated parts;

Figure 2 is a fragmentary view in rear elevation of the structure illustrated in Figure 1;

Figure 3 is a fragmentary view in rear elevation and upon a reduced scale showing the spring of Figures 1 and 2 connected to and supported by its right and left-hand shackles;

Figure 4 is a diagrammatic view on the same scale as Figure 3 showing the action which occurs under a force tending to shift the sprung parts toward the left;

Figure 5 is a view similar to Figure 4 which illustrates the parts under conditions of straight rebound;

Figure 6 is a view similar to Figures 4 and 5, but illustrates a spring which is straight under normal load conditions;

Figure 7 is a diagrammatic view illustrating a modified form of shackle associated with one end of a spring of the kind illustrated in Figures 1 to 5, inclusive;

Figure 8 is a view similar to Figure 7 illustrating a further modified form of shackle;

Figures 9 and 10 are views which correspond, respectively, to Figures 1 and 2, but which illustrate a modified construction.

Figures 11 and 12 are also views corresponding to Figures 1 and 2, but which illustrate a further modified construction; and Figure 13 is a fragmentary, detail, sectional view taken upon the line 13—13 of Figure 12 looking in the direction of the arrows.

The embodiment of Figures 1 to 5, inclusive, comprises an upwardly bowed leaf spring 1 which is arranged to extend transversely of the vehicle and to support the sprung parts midway between its ends. The spring 1 is supported at its ends by shackles 2, which shackles are in turn pivotally suspended from rigid brackets or arms 3. The brackets 3 constitute unsprung parts, being carried by the running gear of the vehicle.

As seen best in Figures 1 and 2, each shackle 2 comprises a pair of arms 4 which take the form of triangular or bell-crank levers. These arms 4 are duplicates of one another and are arranged to act in unison so that they constitute, in effect, a single bell-crank lever. The arms 4 are fulcrumed upon the brackets 3 by means of a bearing pin 5, nuts 6 and 8, and a cylindrical bearing sleeve 7.

The pin 5 is formed with square shanks 9, and reduced threaded ends 10. The square shanks 9 fit square holes in the arms 4. The sleeve 7 surrounds the cylindrical body of the pin 5. The sleeve 7 is received in a cylindrical bearing 12 formed integral with the bracket 3. The parts are assembled as illustrated in Figure 1 with the nuts 6 and 8 tightened.

The spring end is formed with an eye 13 which receives a cylindrical sleeve 14. A square shanked pin 15, similar to the bolt 5, is passed through square openings in the arms 4 and through the sleeve 14 and is secured in place by nuts 16.

The inner ends of the arms 4 are formed with slots 17 which, as illustrated, may be arcuate and concentric with the bolt 15 although neither of these details is essential. A headed bolt 18 is passed through the arms 4 and is clamped in adjusted positions by means of a nut 19 and lock washers 20 and 21. An abutment member comprising a metallic sleeve 22 and a block 23 is fitted upon the bolt 18 between the arms 4. The block 23 may be of steel, brass or any other suitable material. Since metal-to-metal contact would be apt to produce objectionable noises and since, moreover, it might under some conditions provide a check so sudden and violent in its action as to introduce a liability of breakage, the block 23 is desirably made in whole or in part of a yielding, non-metallic material such as rubber. Thus the block 23 may be partly metallic with a facing sleeve or sheet of rubber, or it may be, as illustrated in the drawings, composed entirely of rubber. The block 23 is desirably cylindrical as shown, but it may be made as a flat block or in any other shape desired.

It is the purpose to so construct and arrange the parts that the block 23 will not interfere objectionably with changes of flexure of the spring which result from variations in the spring flexing force which is acting upon the spring, but will strongly resist side sway. The bolt 18 may be secured in any adjusted position desired along the slots 17, the position selected depending upon the spring camber and the degree of resistance to side sway which is desired.

The action may be analyzed by reference to Figures 2, 4 and 5. In Figure 2 the full line position is the normal position; that is to say, with the parts in the full line position the vehicle may be considered to be standing still or running upon straight, even road. When a bump is encountered which acts equally on the wheels at the opposite sides of the vehicle, the spring will tend to straighten and the parts at the left-hand side of the vehicle will be displaced to the dot and dash positions illustrated in Figure 2. At the same time a corresponding displacement of parts downward and toward the right will occur at the right-hand end of the spring 1. The straightening or elongation of the spring tends to swing the shackle illustrated in Figure 2 toward the left, and hence to swing the block 23 downward about the axis of pin 5 as a fulcrum. The center of the spring moves vertically toward the unsprung running gear. The spring end moves down with the pin 15 and also rocks downward about the axis of the pin 15. The combined effect of these motions, together with the straightening of the spring, causes the part of the spring engaged by the block 23 to move downward for a substantial distance, independently of any effect which the block 23 may have upon the spring.

The rocking moment applied to the shackle through the pin 15 has an effective lever arm running from the axis of the pin 5 to the axis of the pin 15, whereas the block 23 is carried upon an effective lever arm running from the axis of the pin 5 to the axis of the bolt 18. The bolt 18 will travel through the same arc as the pin 15 about the axis of the pin 5, and since it has a considerably longer effective lever arm it will travel a considerably longer distance.

The fact that the block engaged portion of the spring is retreating downward through straightening and rocking as the block 23 is depressed has the effect of permitting the block 23 to move downward for quite a substantial distance before any substantial compressive force is applied to the roller. Thus, the spring is permitted to be straightened and elongated to a very substantial extent before the roller is brought to bear with sufficient force against the upper face of the spring to oppose any substantial resistance to rocking of the shackle outward. The action of the spring is substantially the same as if the block 23 were not present.

In Figure 5 the action of the parts on rebound is illustrated. Here the spring is shown as flexed upward beyond the normal condition. The shackles 2 have been rocked inward by the contraction or flexure of the spring, and this has had the effect of swinging the blocks 23 upward out of engagement with the spring 1 as soon as the spring passes upward beyond the normal condition. The result is that the blocks 23 are ineffective to oppose rebound.

In Figure 4 the parts are illustrated in the normal condition in full lines. They are also illustrated in dot and dash lines in positions which they will assume when a sidewise force occurs which tends to throw the sprung parts toward the left. In this view the deformation of the block 23 is exaggerated and the vertical movement of the spring 1 at the left-hand side of the vehicle is exaggerated. The tendency will be substantially to displace the spring 1 bodily toward the left without altering the flexure of the spring. This will tend to carry the left-hand end of the spring slightly downward but principally toward the left.

As before, the axis of the block 23 will travel through the same angle as the bolt 15 which supports the spring end. Since the spring in this case does not retreat downward substantially as the block 23 descends, the block is very quickly checked in its descent by its engagement with the spring.

It is evident, therefore, that the left-hand shackle illustrated and described has the characteristic of opposing strongly any lateral thrust which tends to sway the sprung parts toward the left, but it has little, if any, inclination to oppose spring flexing forces.

The action of the right-hand shackle in opposing any force which tends to sway the sprung parts toward the right is the same as that illustrated for the left-hand shackle in Figure 4.

The block 23 is illustrated as substantially compressed and flattened against the spring in the broken line position of that figure. It is to be understood, however, that the drawing exaggerates the actual condition, the exaggeration being introduced for the purpose of making the point illustrated more conspicuous.

In the embodiment of Figure 6, the parts are all the same as those illustrated in Figures 1 to 5, inclusive, with the exception that the spring 1a is straight under normal load conditions. Corresponding reference numerals have, therefore, been applied to corresponding parts with the subscript a added in each instance.

This embodiment particularly illustrates the point that the shackle may be made absolutely ineffective to alter the normal action of the spring under flexing stresses, but fully effective to check side sway.

The parts are illustrated in Figure 6 in the normal load condition. In this condition the blocks 23a bear lightly against the upper face of the spring 1a. When the vertical load is increased the spring 1a is shortened, the shackles 2a are rocked inward, and the blocks 23a are carried upward away from the spring 1a, which is now downwardly bowed. As the spring recovers, the blocks 23a return to contact with the spring 1a at the normal position, but as soon as the spring passes upward through the normal position on rebound the spring is again shortened, the shackles 2a are again swung inward, and the blocks 23a are carried upward faster than the immediately adjacent portions of the spring, so that the blocks again leave contact with the spring. In this form it is evident that the blocks 23a do not modify the normal flexure of the spring in either direction.

When the vehicle of Figure 6 rounds a curve, however, the tendency will be to displace the spring 1a toward the outer side of the curve without substantially bowing it either upward or downward. In this case the action of the block 23a at the outer side of the curve will be to bear down forcibly against the upper face of the spring and thereby to limit sharply the rocking of the shackle at that side of the vehicle. Thus the shackle is effective to oppose and check side sway in the manner already described with reference to the shackle of Figures 1 to 5.

Figures 7 and 8 illustrate further modified forms of the invention that have to do primarily with variations in the normal disposition of the spring end relative to the fulcrum.

In Figure 7 the arrangement and organization of the parts is generally similar to that of Figures 1 to 5, and hence corresponding reference numerals have been applied to corresponding parts with the subscript b added in each instance.

The spring 1b is an upwardly bowed spring which is pivotally connected at 15b to the shackle 2b at a point located below and in substantially the same vertical plane with the fulcrum 5b. When the spring 1b is straightened under an increase of vertical load the shackle 2b is swung outward, the spring end is moved outward and slightly upward, and the block 23b is swung downward. The portion of the spring immediately adjacent the block 23b tends to retreat before the block through straightening and rocking so that a substantial downward movement of the block 23b is permitted before the block is caused to exert any substantial pressure against the upper face of the spring. On rebound the block 23b is carried away from the upper face of the spring 1b. The block 23b will, as before, tend strongly to oppose any bodily movement of the spring 1b toward the left.

In the embodiment disclosed in Figure 8 the parts are generally similar to those of Figures 1 to 5, and the arrangement and organization are similar. Corresponding reference numerals have, therefore, been applied to corresponding parts with the subscript c added in each instance.

In this embodiment the left-hand end of spring 1c is pivotally connected to the shackle 2c at a point 15c located below and to the left of the fulcrum point 5c. The mounting at the right-hand end of the spring is symmetrical with the illustrative mounting at the left-hand end. In this case an increase of vertical load tending to straighten the spring 1c will displace the left-hand end of the spring outward and upward, the upward component being more pronounced than in Figure 7, and the angular movement of the shackle being greater for a given amount of spring elongation. The spring is caused to retreat before the block 23c through straightening, but this retreat is in part offset by the raising of the spring end at the point 15c. The block 23c will, therefore, tend to build up more quickly a resistance to the straightening of the spring than in the form of Figure 7. On rebound, as before, the block 23c will leave engagement with the spring 1c. The action of the block 23c to oppose and check side sway will be substantially the same as that already described with reference to the other figures.

In some instances it is not necessary that two of the levers 4 be provided at opposite sides of the spring, since one such lever will suffice if the loads to be encountered are not excessive. Such a construction is illustrated in Figures 9 and 10. In this construction many of the parts are the same as in the illustrative form of Figures 1 and 2. Corresponding reference numerals with the subscript d added have been applied to the corresponding parts, and these parts will not be described again.

In this form of the invention a single bell crank lever 4d is provided in place of one of the conventional double pivot shackle links, the other shackle link 24 being left unaltered. A block 23d is mounted upon a pin 25 in position to engage the upper face of the spring, the pin 25 being adapted to be secured in any selected position of adjustment along the slot 17d. The pin 25 has reduced threaded end portions upon which nuts 26 and 27 are threaded. A cotter pin 28 is passed through the pin 25 to prevent the nut 27 from backing off. A washer 29 is interposed between the nut 27 and the block 23d. A flange 30 on the pin 25 is interposed between the block 23d and the lever 4d, and a bearing washer 31 and a lock washer 32 are interposed between a nut 26 and the lever 4d. Tightening of the nut 26 serves to clamp the flange 30 and the washer 31 firmly against opposite faces of the lever 4d and to secure the block in adjusted position. The construction just described is not as sturdy as the construction of Figures 1 and 2, but it has the advantage of being substantially cheaper, and, therefore, preferable in installations where it will serve.

The incorporation of any of the constructions thus far described in an existing vehicle by substitution for original parts involves the removal of one or more of the original shackle links. It is necessary, therefore, in effecting a substitution to use jacks for maintaining alignment of parts or for realigning the parts which get out of alignment.

In the constructions thus far described, moreover, the bell crank levers employed are desirably of as heavy and sturdy construction as the shackle links which they replace.

In Figures 11 to 13 disclosure is made of a modified construction in which the bell crank levers may be of relatively light construction, and in which the levers may be applied without removing the existing shackle links of a vehicle.

In the construction illustrated in Figures 11 to 13 many of the parts correspond to parts illustrated and described in connection with Figures 1 and 2. As to such parts corresponding reference numerals have been applied with the subscript e added in each instance, and no further detailed description will be given.

The levers 4e of Figures 11 to 13 are desirably metal stampings. Each of them is formed with an offset or cupped portion 33 which is adapted to receive and substantially fit a standard shackle link 24e. The base or offset part of the cupped portion is formed with openings 34 which are adapted simultaneously to align with and to pass the reduced ends of the bearing pins 10e and 15e.

In applying the levers 4e and the parts carried by them to a vehicle, it is not necessary to disturb the existing vehicle parts other than to remove the nuts 6e, 8e and 16e. The levers are then impaled upon the bearing pins 10e and 15e and fitted around the double pivot links 24e, whereupon the nuts 6e, 8e and 16e are replaced and tightened to clamp the levers 4e firmly in place. During this operation, it may be necessary for the nut 19e to be backed off more or less, but this is no substantial disadvantage, since the nut can quickly be tightened again and would in any event have to be backed off slightly to permit adjustment of the block 23e into the desired cooperative relation with the spring 1e.

It will be evident that the levers 4e do not have to take over any of the strains of the links 24e, and hence may be designed to be of such weight and strength as will be appropriate for performing the function of checking and controlling side sway; that is to say, for causing the block 23 to bear forcibly against the upper face of the spring when forces tending to produce side sway come into play. If the cupped portions 33 of the levers are formed with surfaces which fit the links 24e accurately, it will not be necessary for the holes 34 to be made small enough to fit the ends of the bearing pins 10e and 15e. The application of the lever 4e can, therefore, be effected with a minimum of effort and particularly with a minimum of fumbling.

I have described what I believe to be the best embodiments of my invention. I do not wish, however, to be confined to the embodiments shown; but what I desire to cover by Letters Patent is set forth in the appended claims.

I claim:

1. In a motor vehicle, the combination with an unsprung part, of a transverse spring supported therefrom, and a shackle for supporting an end of the spring from the unsprung part comprising a lever fulcrumed on the unsprung part and pivotally connected to the spring end at a point below the fulcrum, said lever having a rigid arm that extends inward from the fulcrum and above the spring, and a substantially unyielding block affixed to the arm for movement in unison therewith for pressing against the upper side of the spring to prevent substantial outward rocking of the lever in response to forces which tend to displace the spring laterally of the vehicle without substantially altering the flexure thereof.

2. In a motor vehicle, the combination with an unsprung part, of a transverse spring supported therefrom, and a shackle for supporting an end of the spring from the unsprung part comprising a bell-crank lever fulcrumed on the unsprung part and pivotally connected to the spring end at a point below the fulcrum, said lever having an arm that extends inward from the fulcrum, and an abutment member carried by the arm for pressing against the upper side of the spring to prevent substantial outward rocking of the lever in response to forces which tend to displace the spring laterally of the vehicle without substantially altering the flexure thereof, the arm being of such length that the abutment member is carried downward under increase of vertical load to substantially no greater extent than the portion of the spring against which the abutment member is arranged to bear.

3. In a motor vehicle, the combination with an unsprung part, of a transverse spring supported therefrom, and a shackle for supporting an end of the spring from the unsprung part comprising a bell-crank lever fulcrumed on the unsprung part and pivotally connected to the spring end at a point below the fulcrum, said lever having an arm that extends inward from the fulcrum, and an abutment member carried by the arm for pressing against the upper side of the spring to prevent substantial outward rocking of the lever in response to forces which tend to displace the spring laterally of the vehicle without substantially altering the flexure thereof, the arm being of such length that the abutment member is carried downward under increase of vertical load to substantially no greater extent than the portion of the spring against which the abutment member is arranged to bear, and the abutment member is caused to be carried out of bearing relation with the spring on rebound.

4. In a motor vehicle, the combination with an unsprung part, of a transverse spring supported therefrom, and shackles at opposite ends of the spring for supporting the respective ends of the spring from the unsprung part comprising in each instance a bell-crank lever fulcrumed on the unsprung part and pivotally connected to the spring end at a point below the fulcrum, said lever having a rigid arm that extends inward from the fulcrum, and a block carried by the arm for pressing against the upper side of the spring to prevent substantial outward rocking of the lever in response to forces which tend to displace the spring laterally of the vehicle without substantially altering the flexure thereof, said block having a face of deformable, nonmetallic material.

5. In a motor vehicle, the combination with an unsprung part, of a transverse spring supported therefrom, and a shackle for supporting an end of the spring from the unsprung part comprising a bell-crank lever fulcrumed on the unsprung part and pivotally connected to the spring end at a point below the fulcrum, said lever having an arm that extends inward from the fulcrum, and an abutment member carried by the arm for pressing against the upper side of the spring to prevent substantial outward rocking of the lever in response to forces which tend to displace the spring laterally of the vehicle without substantially altering the flexure thereof, said abutment member consisting of a roller.

6. In a motor vehicle, the combination with an unsprung part, of a transverse spring supported therefrom, and a shackle for supporting an end of the spring from the unsprung part comprising a bell-crank lever fulcrumed on the unsprung part and pivotally connected to the spring end at a point below the fulcrum, said lever having a rigid arm that extends inward from the fulcrum, and a block carried by the arm for pressing against the upper side of the spring to prevent substantial outward rocking of the lever in response to forces which tend to displace the spring laterally of the vehicle without substantially altering the flexure thereof, and means for adjusting the block on the arm relative to the spring.

7. In a motor vehicle, the combination with an unsprung part, of a transverse spring supported therefrom, and a shackle for supporting an end of the spring from the unsprung part comprising a bell-crank lever fulcrumed on the unsprung part and pivotally connected to the spring end at a point below the fulcrum, said lever having an arm that extends inward from the fulcrum, an abutment member carried by the arm for pressing against the upper side of the spring to prevent substantial outward rocking of the lever in response to forces which tend to displace the spring laterally of the vehicle without substantially altering the flexure thereof, and means for adjusting the abutment member on the arm in an arcuate path substantially concentric with the spring end.

8. In a motor vehicle, the combination with an unsprung part, of a transverse spring supported therefrom, and a shackle for supporting an end of the spring from the unsprung part comprising a bell-crank lever fulcrumed on the unsprung part and pivotally connected to the spring end at a point below the fulcrum, said lever having an arm that extends inward from the fulcrum, and an abutment member carried by the arm for pressing against the upper side of the spring to prevent substantial outward rocking of the lever in response to forces which tend to displace the spring laterally of the vehicle without substantially altering the flexure thereof, said abutment member comprising a bolt, means for securing the bolt in different adjusted positions on the arm, and a block mounted on the bolt.

9. In a spring suspension, the combination with a leaf spring, of means at opposite ends of the spring for supporting the respective ends of the spring with capacity for rocking and bodily movement, said supporting means and spring having cooperating parts in each instance for controlling side sway, said parts arranged to be pressed firmly and substantially unyieldingly against one another in opposed relation in response to lateral forces which tend to move the spring end outward sidewise of the vehicle without substantially altering the flexure of the spring, at least one of said parts in each instance being shiftable in response to forces which change the flexure of the spring to enable the spring end to move outward.

10. In a spring suspension, the combination with a leaf spring, of means at opposite ends of the spring for supporting the respective ends of the spring with capacity for rocking and bodily movement, each of said supporting means comprising substantially unyielding abutment means for bearing forcibly against the spring to oppose bodily outward movement of the associated spring end in response to forces which do not tend to alter the flexure of the spring substantially, and means for causing the abutment means and the abutment-engaged spring part to have such relative movement in response to flexure of the spring that interference with spring flexure is substantially avoided.

11. In a motor vehicle, the combination with an unsprung part, of a transverse spring supported therefrom, and a shackle for supporting an end of the spring from the unsprung part comprising a lever fulcrumed on the unsprung part and pivotally connected to the spring end at a point below the fulcrum and displaced inwardly therefrom, said lever having a rigid arm that extends inward from the fulcrum and above the spring, and a substantially unyielding block affixed to the arm for movement in unison therewith for pressing against the upper side of the spring to prevent substantial outward rocking of the lever in response to forces which tend to displace the spring laterally of the vehicle without substantially altering the flexure thereof.

12. In a motor vehicle, the combination with an unsprung part, of a transverse spring supported therefrom, and a shackle for supporting an end of the spring from the unsprung part comprising a lever fulcrumed on the unsprung part and pivotally connected to the spring end at a point below the fulcrum and normally in the vertical plane thereof, said lever having a rigid arm that extends inward from the fulcrum, and a block affixed to the arm for pressing against the upper side of the spring to prevent substantial outward rocking of the lever in response to forces which tend to displace the spring laterally of the vehicle without substantially altering the flexure thereof.

13. In a motor vehicle, the combination with an unsprung part, of a transverse spring supported therefrom, and a shackle for supporting an end of the spring from the unsprung part comprising a lever fulcrumed on the unsprung part and pivotally connected to the spring and at a point below the fulcrum and displaced outwardly therefrom, said lever having a rigid arm that extends inward from the fulcrum, and a block affixed to the arm for pressing against the upper side of the spring to prevent substantial outward rocking of the lever in response to forces which tend to displace the spring laterally of the vehicle without substantially altering the flexure thereof.

14. In a motor vehicle, the combination with an unsprung part, of a normally straight transverse spring supported therefrom, and a shackle for supporting an end of the spring from the unsprung part comprising a lever fulcrumed on the unsprung part and pivotally connected to the spring end at a point below the fulcrum and displaced inwardly therefrom, said lever having a rigid arm that extends inward from the fulcrum, and a block affixed to the arm for pressing against the upper side of the spring to prevent substantial outward rocking of the lever in response to forces which tend to displace the spring laterally of the vehicle without substantially altering the flexure thereof.

15. In a motor vehicle, the combination with an unsprung part and a sprung part supported therefrom, of means at opposite sides of the vehicle for limiting and checking relative sidewise movement of said parts comprising in each instance a lever fulcrumed on the unsprung part at one side of the vehicle, a transversely extending member pivotally connected to the lever below the fulcrum and connected to the sprung part at a point located a substantial distance inward from the fulcrum, said transverse member having capacity at the latter point to rise and descend in unison with the sprung part as the sprung and unsprung parts approach and separate, and adapted as an incident of such movement to produce a concomitant rocking of the lever about its fulcrum and of the transverse member about its point of pivotal connection to the lever, said lever having a rigid arm that extends inward from the fulcrum, and a substantially unyielding abutment affixed to the arm for pressing against the upper side of the transverse member to limit and check outward rocking movement of the lever in response to forces which tend to displace the sprung part laterally outward in relation to the unsprung part.

16. In a motor vehicle, the combination with an unsprung part and a sprung part supported therefrom, of means for limiting and checking relative sidewise movements of said parts comprising a lever fulcrumed on the unsprung part at one side of the vehicle, a transversely extending member pivotally connected to the lever at a point removed from the horizontal plane of the fulcrum, and connected to the sprung part at a point which is located a substantial distance inward from the fulcrum and normally substantially in the horizontal plane of the point of pivotal connection of said transverse member with the lever, said transverse member having capacity at its point of connection with the sprung part to rise above and descend below such horizontal plane in unison with the sprung part as the vertical distance between the sprung and unsprung parts increases above or diminishes below normal, and adapted as an incident of either movement to produce a concomitant rocking of the lever about its fulcrum in the same direction away from the normal position of the lever, said lever having a rigid arm that extends inward from the fulcrum, and a substantially unyielding abutment affixed to the arm and bearing normally against the transverse member at the side of said member nearest the lever fulcrum, to limit and check swinging of the lever away from the normal position of the lever in the direction opposite to that in which the lever is swung as the vertical distance between the sprung and unsprung parts departs from normal, thereby to limit and check displacement of the sprung part laterally outward in relation to the unsprung part.

HARVEY W. BELL.